Oct. 25, 1960  H. A. TOULMIN, JR  2,957,773
METHOD AND APPARATUS FOR CRYSTAL PRODUCTION
Filed July 25, 1955
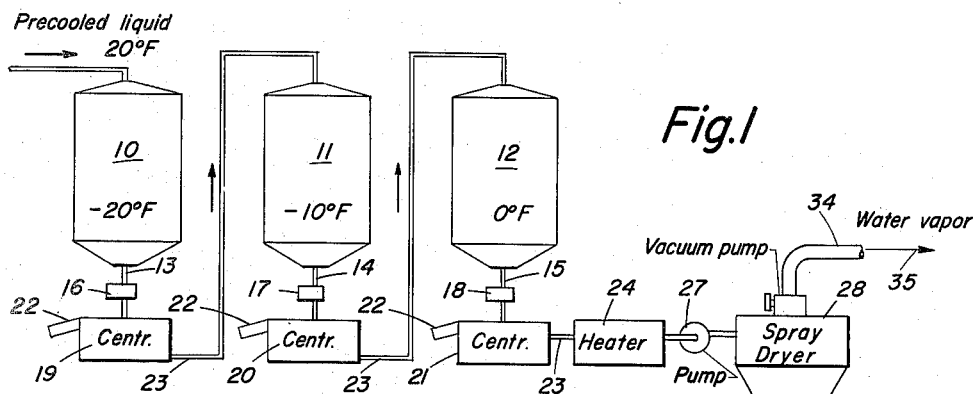
Fig.1
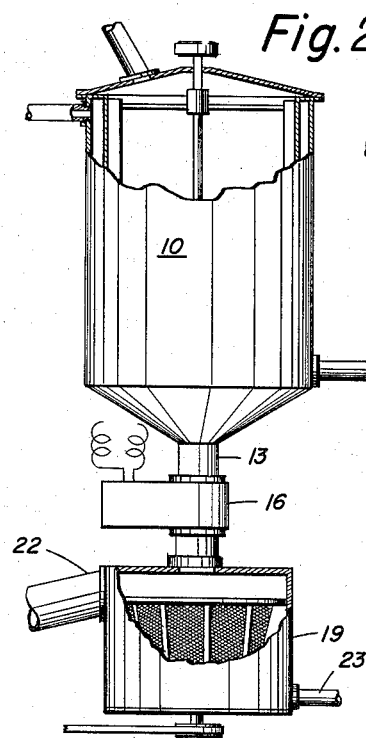
Fig.2
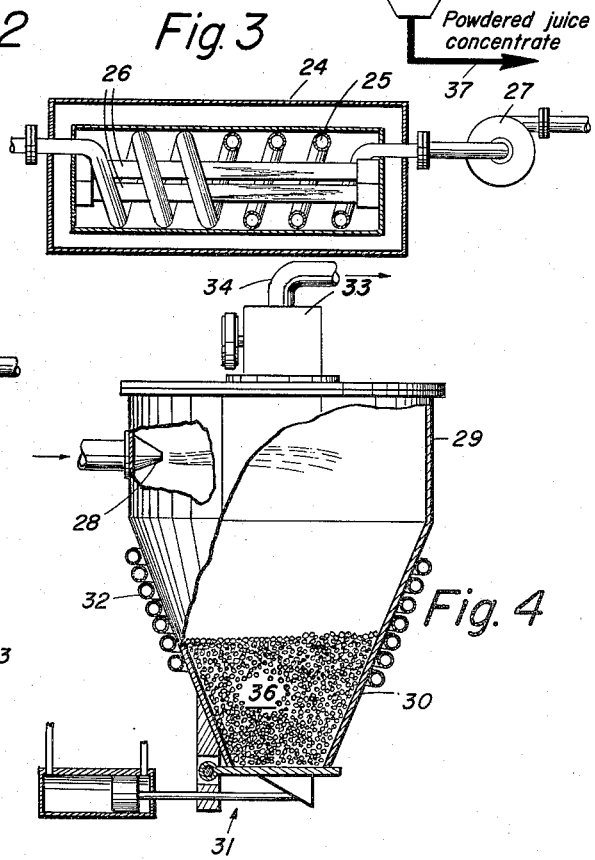
Fig.3
Fig.4
INVENTOR
HARRY A. TOULMIN, JR.
BY
ATTORNEYS United States Patent Office 2,957,773
Patented Oct. 25, 1960

2,957,773

METHOD AND APPARATUS FOR CRYSTAL PRODUCTION

Harry A. Toulmin, Jr., Dayton, Ohio, assignor, by mesne assignments, to Union Carbide Corporation, New York, N.Y., a corporation of New York Filed July 25, 1955, Ser. No. 524,053

4 Claims. (Cl. 99—206)

The present invention relates to the concentration of a heat-sensitive liquid containing solids, more particularly, to a method including low temperature dehydration of fruit juices and the like which results in a juice concentrate in the form of a powdered granular residue.

The present invention is particularly suited to the concentration of citrus juices. However, the process disclosed herein may be successfully applied to other products, such as fruit juices, beer, wines, pharmaceuticals such as antibiotics, heat-sensitive resins, coffee, milk and vegetable juices. This list is not exclusive but exemplifies the products to which this invention may be applied.

The citrus juice industry, in particular, has expended considerable effort to concentrate citrus juices into concentrates which may be readily reconstituted merely by the addition of water. This reconstituted juice should have the taste and other flavor characteristics of the original, fresh, raw juice.

To date, juice concentrates have been in the form of a heavy liquid or a slushy mass comprising liquid and ice crystals. While concentrates in these forms have been satisfactory, they have the obvious disadvantage of necessitating storage under refrigeration. If not under refrigeration they are susceptible to spoilage. It would, therefore, be to the advantage of the industry and consumers if the juice concentrate could be made in a form which would not involve special storage conditions, such as refrigeration.

As a result, attention has been directed to the concentration of citrus juices in powder or crystalline form. Powdered juice concentrates have many advantages. Primary of these would be the storage of such concentrates under room temperature conditions. Furthermore, since a higher degree of water is removed in order to result in a dry concentrate, powdered juice concentrates have a higher degree of concentration. Consequently, shipping costs of the industry are lowered since the dry concentrate has substantially all of the water removed therefrom. Again, the mere addition of pure water by the consumer will reconstitute the juice concentrate and the result will be a juice having all the characteristics of natural, fresh fruit juices.

The conventional method of reducing a juice to powder involves the use of heat. The use of heat, however, affects the heat-sensitive constituents of the juice. This, in turn, modifies the taste and flavor of the juice. Furthermore, the use of heat would remove aromatics by volatilization. These aromatics, while occurring in fruit juices to the extent of about 1%, are also a source of taste and flavor of the juice.

In order to obtain a juice concentrate that will have all of the natural characteristics therein, attempts have been made to restore the flavor of the juice. These attempts have usually involved the cutting back of such juices to a juice concentrate or by the addition of flavoring extracts. The ideal concentration process would eliminate the necessity for these flavor restoration measures.

The present invention is directed to producing a powdered juice concentrate. This method eliminates the disadvantages enumerated above and encountered in the conventional process of obtaining a powdered juice concentrate.

In the process disclosed in this invention, the raw juice is dehydrated through a suitable low temperature process. This process may consist of conveying the juice through a plurality of freezer units, each one of which is maintained at a higher temperature differential than the preceding unit. The ice which is removed from the juice in each one of these units is separated after each freezing step. The dehydrated juice is then heated to room temperature. The heated juice is sprayed into a chamber in the form of a fine mist. The chamber is maintained under sub-atmospheric pressure which is below the vapor pressure of water at room temperature. Consequently, the water will evaporate within the chamber and is drawn off by a suitable pump. The residue will comprise granular solids, some of which will be in crystalline form. The residue is then collected from the chamber and may be further comminuted to form a powdered juice concentrate having uniformly sized particles.

The various components of the apparatus which produces the powdered juice concentrate are largely conventional. It is the system of the combination of these components into a particular arrangement which results in a juice concentrate having all of the natural taste and flavor characteristics therein, which is an improvement upon prior art systems.

It is therefore the principal object of this invention to provide a novel and improved apparatus and method of concentrating a liquid containing solids.

It is another object of this invention to provide an apparatus and method for obtaining a juice concentrate in the form of a granular residue.

It is an additional object of this inventon to provide an apparatus and method wherein a low temperature dehydrated liquid is warmed to substantially room temperature and vacuum evaporated to obtain a concentrate of granular particles.

It is a further object of this invention to provide an apparatus and method wherein the remaining water is removed from a low temperature dehydrated liquid within a partial vacuum atmosphere to obtain a final concentrate in the form of a granular residue.

Other objects and advantages of this invention will become readily apparent upon reference to the accompanying description when taken in conjunction with the following drawings wherein:

Figure 1 is a schematic arrangement of the system with the flow of juice between units being indicated;

Figure 2 is an elevational view of one of the freezer tanks combined with a centrifuge with portions of each removed to show inner structural details;

Figure 3 is a longitudinal sectional view of the heater unit; and

Figure 4 is an elevational view of the vacuum chamber with a portion of the outer wall removed.

Reference to Figure 1 will illustrate the coordinated steps of the process of this inventon. Each of the components of the system together with the relative arrangement of these components will first be described.

Returning to Figure 1 wherein reference symbols indicate the same parts throughout the various views, 10, 11 and 12 indicate freezer units within which water in the form of ice crystals is removed from the fresh juice. The freezer units further shown in Figure 2, are conventional freezer tanks, such as disclosed in the United States Patents 2,559,205 and 2,657,549 to Wenzelberger.

Each of the freezer units have discharge lines 13, 14 and 15 extending from the bottom thereof. There are solenoid operated valves 16, 17 and 18 in each of the discharge lines. The valves are operated from a master control panel and may be automatically actuated to release the frozen juice concentrate from each one of the tanks after a predetermined interval of time.

The discharge lines extending from the freezer units lead to centrifuges 19, 20 and 21. The centrifuges are conventional in construction in that each comprises a perforated rotating cage wherein the liquid is separated from the ice crystals through the action of centrifugal force. Each of the centrifuges has an ice discharge conduit 22 and a juice conduit 23. The juice conduits extending from centrifuges 19 and 20 lead to the next freezing units. The juice conduit extending from the centrifuge 21 leads to a heating chamber 24 shown in Figure 3. Within the heating chamber the juice from the freezer unit 12 is conveyed through a coil 25 within which a plurality of heater units indicated at 26 are mounted. The heater units heat the chamber to a room temperature of about 70° F. Consequently, when the juice emerges from the heating chamber it is at substantially room temperature.

Upon emerging from the heating chamber the juice is passed into a pump 27. The pump 27 functions to draw the juice through the coils of the heating chamber. In addition, the pump sprays or diffuses the heater juice through a spray nozzle 28 into a hermetically sealed chamber 29 further shown in Figure 4. The chamber 29 has a converging bottom which forms a hopper 30. Valve means 31 which are remotely actuated serve to open the hopper to remove the solids which are collected in the bottom of the chamber. Heating coils 32 surround the chamber and are adapted to raise the temperature only a few degrees.

The chamber 29 is maintained at a sub-atmospheric pressure of 20 mm. of mercury or less. This is accomplished by means of a vacuum pump 33 mounted atop the chamber. Water vapors are also drawn off from the chamber by the vacuum pump and are discharged through the conduit 34, as indicated at 35.

With the apparatus of this invention in mind, as described above, the processing of the juice will next be described.

The fresh juice before being delivered to the freezer units, is precooled to a temperature of about 20° F. The precooled juice is then unloaded into the freezer unit 10 which is maintained at a temperature of —20° F. The subjection of the precooled juice to such a low temperature at the inception of the dehydration process will result in maximum water removal at that time when there is maximum water content within the juice.

The juice within the freezer unit 10 must be vigorously agitated to prevent the occlusion of juice and other solid particles in the ice formed therein. By vigorous stirring of the juice during the process of freezing in this unit, large sized ice crystals are formed which essentially comprise pure water.

After the completion of the first freezing stage, the juice has a concentration of about Brix 18°. The partially dehydrated juice is then delivered through the discharge line 13 into the centrifuge 19 where the crystals of ice are separated from the juice. The juice separated within the centrifuge 19 is then delivered to the freezer unit 11.

The freezer unit 11 is similar to structure to the freezer unit 10. However, this unit is maintained at a temperature of —10° F. By increasing the temperature at which the juice is to be frozen, additional water within the partially dehydrated juice will be removed. Again, by vigorously stirring the juice within the freezer unit 11, the water will be removed in the form of ice crystals which are somewhat smaller than the crystals produced in the freezer unit 10. This is true because the water content of the juice within the freezer unit 11 is less than when the juice was processed at the first freezing stage.

When the juice within the freezer unit 11 attains a concentration of Brix 25°, it is delivered through the discharge line 14 into the centrifuge 20. Similarly, the ice crystals formed within the freezer unit 11 are separated from the partially dehydrated juice and the juice is then delivered to the freezer unit 12.

The freezer unit 12 is maintained at 0° F. In this unit an additional quantity of water is removed and the resultant dehydrated juice has a concentration of Brix 40°. By vigorously agitating the juice within this unit, the crystals formed therein are, in turn, progressively smaller than the crystals formed in the preceding freezer units.

When this freezing step has been accomplished, the slushy mass produced within this freezing stage is then delivered through the discharge line 15 into the centrifuge 21 where again the ice crystals are separated from the dehydrated juice.

The dehydrated juice separated within the centrifuge is then delivered to the heating chamber 24 where it is gradually heated to room temperature or 70° F.

The heated juice is then diffused into the chamber 29 through the action of the pump 27 and the spray nozzle 28. The result is a fine mist of dehydrated juice which is at approximately 70° F. The vapor pressure of water at room temperature is approximately 1.8 centimeters of mercury. Therefore, by maintaining the interior of the chamber 29 at sub-atmospheric pressure of 18 mm. of mercury or less, the water within the chamber will evaporate by applying a small amount of heat to the chamber by means of the heating coils 32. The water vapors will then be drawn off through the conduit 34 under the action of the vacuum pump 33. The residue remaining after the water vapors have been removed will consist of solid particles which will descend to the hopper 30 and accumulate, as indicated at 36. This residue will be in the form of solid or granular matter. Some of the residue may be crystalline in structure.

Upon removal of virtually all of the water vapor from the residue remaining in the chamber, the residue is then discharged, as shown at 37, through the valve 31 for further processing. This processing may comprise the comminution of the residue to result in a powdered juice concentrate of uniformly sized grains.

As mentioned previously, fruit juices comprise heat-sensitive materials which are adversely affected by the application of heat to the juice. By heating the juice to room temperature, the amount of heat applied thereto is insufficient to adversely affect the flavor and taste characteristics of the juice. In addition, by limiting the heating of the juice to room temperature, the volatilization of the aromatics from the juice is largely prevented.

If the juice were not heated, a greater vacuum would be required to evaporate the water vapors therefrom. Therefore, by heating the juice to room temperature prior to evacuation, less vacuum is required and the heat sensitive constituents of the juice are relatively unaffected.

The heating of the juice also melts any ice which was not removed during the centrifuging process. Therefore, when the juice is diffused within the chamber 29, all of the water is in liquid form and may be readily evaporated at the sub-atmospheric pressure of the evaporation chamber.

It is pointed out that the process of this invention is essentially one of increasing temperatures. The low temperature dehydration of the fresh juice is called "shock freezing" in that the fresh juice is initially subjected to a low temperature for maximum water removal. The temperatures at which the dehydration is carried out are subsequently progressively increased.

Further dehydration of the juice would result in increasing the Brix concentration of the juice. However, the dehydration process is discontinued when the juice reaches a concentration of Brix 40° in order to prevent any removal of solids and aromatics from the juice. By slowly increasing the temperature of the juice from 0° F. to about 70° F., there will be little volatilization of the juice. In addition, the juice will retain a considerably greater percentage of the solid particles which are processed within the evaporating chamber into powdered form. To obtain the maximum production of powdered juice concentrate, the loss of solids within the juices in the dehydration process must be kept to an absolute minimum.

Thus it can be seen that the present invention discloses an efficient and simplified process of producing a powdered juice concentrate. The advantages of powdered concentrates over other forms of concentrates are apparent. By employing the simplified process as disclosed in this invention, a considerable and valuable improvement has been made in the art.

It will be understood that this invention is susceptible to modification in order to adapt it to different usages and conditions, and, accordingly, it is desired to comprehend such modifications within this invention as may fall within the scope of the appended claims.

What is claimed is:

1. A method of concentrating an aqueous heat-sensitive liquid containing solids into solid particles comprising the steps of subjecting the liquid to a low temperature below the freezing point of the liquid to form ice crystals therein, passing the liquid through a plurality of stages of progressively increasing temperature but below the freezing point of the liquid to form additional ice crystals to progressively dehydrate the liquid, separating the ice crystals from the liquid after each stage, heating the dehydrated liquid to room temperature as it emerges from the last stage, diffusing the heated liquid into a spray, and subjecting the spray to a vacuum to evaporate the water therefrom and to obtain a residue of solids.

2. A method of concentrating a material comprising water and solids into solid particles comprising the steps of subjecting the material to a low temperature, passing the material through a plurality of stages of progressively increasing temperature below the freezing point of the material to form ice crystals and to dehydrate the material, separating the ice crystals from the material after each freezing stage, heating the dehydrated material to room temperature as it emerges from the last stage, spraying the heated material into a partial vacuum, and maintaining the partial vacuum at a pressure below the vapor pressure of water at room temperature whereby the water is evaporated from the material to result in a concentrate of solids.

3. A process of concentrating fruit juice through low-temperature dehydration comprising the steps of subjecting the fruit juice to a sudden and marked drop in temperature to a temperature below the freezing point of the fruit juice to form ice crystals of substantially pure water to remove the maximum amount of water when the water content is at a maximum, agitating the juice while it is being subjected to this low temperature, removing the ice crystals by centrifuging, subjecting the fruit juice concentrate to progressively increasing freezing temperature steps to form additional ice crystals of substantially pure water to further dehydrate the fruit juice, removing the ice crystals after each freezing step, gradually heating the resultant fruit juice concentrate to room temperature, and rapidly evaporating the heated concentrate to remove the remainder of the water therefrom so that the remainder of the concentrate comprises solid particles.

4. In combination, a series of interconnected freezer units through which a liquid containing solids is circulated to be dehydrated to form a liquid concentrate, means in said series of freezer units for passing a liquid containing solids from one freezer unit to the next freezer unit, means within each of said units for vigorously agitating the contents thereof, said units being maintained at progressively higher temperatures, means connected after each of said freezer units for removing ice crystals formed in each freezer unit, means connected to the last of said series of units for heating liquid concentrate, means connected between the last of said freezer units and said heating means for removing the dehydrated liquid from the freezer unit and passing it to the heating means, means connected to said heating means for vacuum evaporation of the heated liquid concentrate to further concentrate the liquid concentrate into solids, and means on said evaporating means for removing the concentrated solids therefrom.

References Cited in the file of this patent

UNITED STATES PATENTS

| | | |
|---|---|---|
| 1,636,890 | Zorn | July 26, 1927 |
| 2,453,142 | Lee | Nov. 9, 1948 |
| 2,559,204 | Wenzelberger | July 3, 1951 |
| 2,656,276 | Toulmin | Oct. 20, 1953 |

OTHER REFERENCES

Textbook: Citrus Products, by J. S. Braverman, published 1949 by Interscience Publishers, Inc., New York, New York, page 299.